United States Patent Office 3,733,268
Patented May 15, 1973

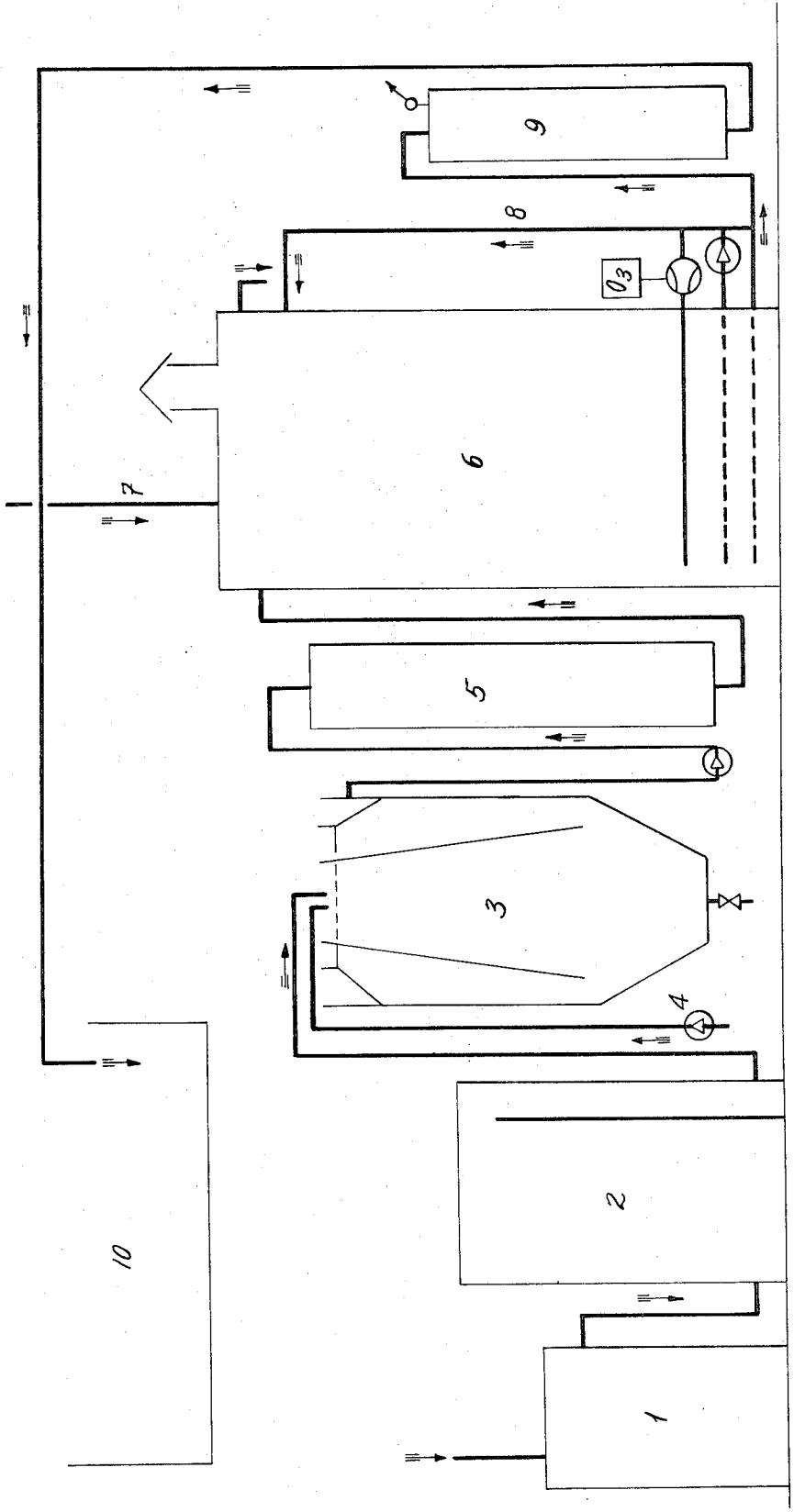

3,733,268
PROCESS OF TREATING AND PURIFYING SEWAGE, PARTICULARLY OF SEWAGE CONTAMINATED WITH DETERGENTS
Karl Marschall, 3/7 Zenogasse, A–112 Vienna, Austria
Filed Dec. 8, 1970, Ser. No. 96,246
Claims priority, application Austria, Dec. 11, 1969, 11,559/69
Int. Cl. C02b 1/38
U.S. Cl. 210—27                    1 Claim

ABSTRACT OF THE DISCLOSURE

A sewage purification process wherein sewage is contacted with ozone and other gases after an optional pre-purifiaction in a recirculation system under substantially atmospheric pressure.

---

An economic process for the purification of sewage which is contaminated with detergents to obtain water of high purity which may be re-used is not yet available. It is an object of the present invention to treat sewage so that the purified water can be re-used. It is already known to sterilize water by a treatment with ozone. It is also known to purify contaminated water by a treatment with ozone to oxidize the impurities. Such processes are disclosed, e.g., in the Austrian patent application No. 214,808 and the printed German application No. 1,239,994, No. 1,269,960 and No. 1,256,164.

The present invention relates to a process for treating or purifying sewage, particularly of sewage which is contaminated with detergents, by a treatment with ozone. The process is especially adaptable for use in treating sewage from car-washing installations, laundries, and the like. The process may include a preliminary treatment resulting in a separation of oil. The flocculated particles may be aerated, precipitated and, if desired, removed. Finally, the prepurified sewage is contacted in a container under substantially atmospheric pressure with a mixture of ozone and other gases and the sewage to be reacted or to be maintained in contact with the gases is recirculated in that the sewage is sucked from the lower portion of the container and is conducted through a recirculation system which is disposed outside of the container and consists particularly of a pipe of suitable size, whereby the sewage is returned into the ozonizing container and is thus recirculated. In the process, sewage to be purified is subjected to a prepurification, which may comprise a separation of oil and an aeration, filtration and removal of the flocculated particles, and the prepurified sewage is contacted with ozone and is moved in a recirculation system under substantially atmospheric pressure, the ozone or a mixture of ozone and other gases being supplied in a container.

The present process differs from the known processes in that it is carried out under substantially atmospheric pressure. The pressures which arise generally do not exceed 0.5 kilogram per square centimeter above atmospheric pressure. The present process has the advantage that the need for a supervision of pressure vessels and other disadvantages involved in the use of pressure vessels are eliminated.

The single figure shows a schematic arrangement for the process of the present invention.

The process according to the invention may be carried out, by way of example, as follows: Sewage, such as that from car-washing installations, laundries, and the like which is contaminated with detergents as well as with oil, grease and fat must be subjected first to a coarse purification for a removal of oil, grease and fat as well as solvents. The sewage is initially collected in a collecting container 1 and is supplied to a separator 2 for a removal of oil, grease and fat as well as of solvents, such as gasoline, toluene, acetone, etc. Air is bubbled through this container to accelerate the separation of oil and to strip the volatile solvents. After the removal of oil, the sewage flows into a reaction container 3, in which chemicals consisting of a flocculating agent are added at a metered rate. The supply of a flocculating agent to the reaction container results in a sedimentation of a major part of the dirt and of the colloids.

The supply of the flocculating agent may be controlled by a flow controller 4 or a metering pump 4. Sludge is periodically withdrawn from the separator for oil, grease and fat and from the reaction container under control of a timer. The sewage from which dirt has been removed is passed through a gravel filter 5, which retains any remaining coarse particles of dirt and flocculating agent. The gravel filter unit is designed for a fully automatic backwashing of the gravel filter. The backwashing of the gravel filter is initiated under control of a differential pressure gauge, which must be operable only when the plant is shut down so that backwashing during normal operation is prevented.

The container 6 is open-topped and provided with an exhaust pipe through which the surplus air-ozone mixture can escape freely. An activated carbon filter may be incorporated in the exhaust pipe to break down the surplus ozone in the exhaust air into oxygen. Alternatively, this exhaust air may be used for a conditioning of air in rooms.

The ozone-contacting container may be made of steel or concrete.

To make up for losses of water fresh water 7 is supplied into the gas-contacting container 6 from the top thereof. When the sewage has been recirculated in the plant 8 it is passed through an activated carbon filter 9 which breaks down residual ozone into oxygen. From the filter, the water flows into the pure water tank 10 for re-use.

The invention relates also to an installation which serves to carry out the process and in which the several components of the plant are connected in a practical arrangement. Such plants may be used to great advantage particularly in connection with laundries having cleaning units in which acetone is employed, as well as in car-washing installations. In this case, the water consumption is much reduced, which is of special importance in locations where water is not available in sufficient quantites or where the cost of water is high for any reason whatever.

I claim:
1. A process of treating sewage from car-washing installations, laundries, and the like for re-use which comprises the steps of:
   (a) separating from such sewage, oil, grease, fat, and solvents;
   (b) adding to the sewage from (a) a flocculating agent to cause a sedimentation of the dirt and colloids in the sewage;
      (c) in a container with ozone at a substantially
   (d) contacting a body of the resultant sewage from (c) in a container with ozone at a substantially atmospheric pressure;
   (e) withdrawing the resultant ozone-contacted sewage from the lower portion of said container and introducing it into the upper portion thereof, whereby said sewage is recirculated in contact with ozone;
   (f) contacting the recirculated ozone contacted sewage in (e) with activated carbon to remove surplus ozone;
   (g) collecting and re-using the water obtained in (f); and
   (h) retreating the water in (g) according to the preceding sequence of steps.

(References on following page)

References Cited

UNITED STATES PATENTS

| | | | |
|---|---|---|---|
| 1,951,240 | 6/1933 | Putnam | 210—63 X |
| 2,405,553 | 8/1946 | Allison | 210—63 |
| 3,549,528 | 12/1970 | Armstrong | 210—63 X |
| 3,296,122 | 1/1967 | Karassik et al. | 210—63 X |
| 3,455,820 | 7/1969 | Joyce et al. | 210—40 |
| 3,650,950 | 3/1972 | White | 210—60 |

OTHER REFERENCES

Kwie, William W.: "Ozone Treats Wastestreams From Polymer Plant," Water & Sewage Works: 116, p. 74 (1969).

SAMIH N. ZAHARNA, Primary Examiner

T. G. WYSE, Assistant Examiner

U.S. Cl. X.R.

210—60, 63, 73, 259

UNITED STATES PATENT OFFICE
CERTIFICATE OF CORRECTION

Patent No. 3,733,268  Dated May 15, 1973

Inventor(s) KARL MARSCHALL

It is certified that error appears in the above-identified patent and that said Letters Patent are hereby corrected as shown below:

Column 2, line 57, cancel "in a container with ozone at a substantially" and substitute -- separating the dirt and colloidal matter in (b); --

Signed and sealed this 27th day of November 1973.

(SEAL)
Attest:

EDWARD M. FLETCHER, JR.          RENE D. TEGTMEYER
Attesting Officer                 Acting Commissioner of Patents